United States Patent
Oranth et al.

(10) Patent No.: US 9,700,845 B2
(45) Date of Patent: Jul. 11, 2017

(54) MICRO FLOW FILTRATION SYSTEM AND FLOW FILTRATION METHOD FOR A FLUID SAMPLE

(71) Applicant: Hoffmann-La Roche Inc., Little Falls, NJ (US)

(72) Inventors: Norbert Oranth, Voerstetten (DE); Nadine Losleben, Mannheim (DE); Sascha Lutz, Neustadt (DE); Adelbert Grossmann, Eglfing (DE)

(73) Assignee: Hoffmann-La Roche Inc., Little Falls, NJ (US)

( * ) Notice: Subject to any disclaimer, the term of this patent is extended or adjusted under 35 U.S.C. 154(b) by 329 days.

(21) Appl. No.: 14/386,092

(22) PCT Filed: Mar. 25, 2013

(86) PCT No.: PCT/EP2013/056296
§ 371 (c)(1),
(2) Date: Sep. 18, 2014

(87) PCT Pub. No.: WO2013/144090
PCT Pub. Date: Oct. 3, 2013

(65) Prior Publication Data
US 2015/0083665 A1 Mar. 26, 2015

(30) Foreign Application Priority Data
Mar. 29, 2012 (EP) ..................................... 12162009

(51) Int. Cl.
*B01D 61/14* (2006.01)
*B01D 61/20* (2006.01)
(Continued)

(52) U.S. Cl.
CPC ........... *B01D 61/20* (2013.01); *B01D 61/145* (2013.01); *B01D 61/18* (2013.01); *B01D 61/22* (2013.01);
(Continued)

(58) Field of Classification Search
None
See application file for complete search history.

(56) References Cited

U.S. PATENT DOCUMENTS 4,367,140 A  1/1983 Wilson
5,674,394 A * 10/1997 Whitmore ........... A61M 1/3496
                                                          210/321.6

(Continued)

FOREIGN PATENT DOCUMENTS

CA  2347375 A1  3/2001
EP  0995483     4/2000
(Continued)

OTHER PUBLICATIONS

The extended European Search Report, issued on Jul. 19, 2012, in the related European Patent Application No. 12162009.0.
(Continued)

*Primary Examiner* — Krishnan S Menon

(57) ABSTRACT

A flow filtration system (1) for concentration of components contained in a fluid sample comprises a fluid channel (2) being formed by two conduits (4, 5) allowing a bidirectional flow of the fluid sample through the fluid channel (2), a tangential flow filtration module (3) and at least two pairs (8, 9) of piston pumps (6) each having two piston pumps (6), wherein the piston pumps (6) having a piston swept volume forming a reservoir being able to contain the fluid for volumes of up to 100 ml. The tangential flow filtration module (3) is located in the fluid channel (2) so that a fluid flowing through the channel (2) passes through the filtration
(Continued)

module (3). At each end (10, 11) of the channel (2) one piston pump (6) of each pair (8, 9) of piston pumps (6) is located in such a manner that the piston pumps are fluidically connected in parallel. The system (1) is arranged and adapted such that during the concentration process at least for a predetermined period of time only one of the pairs (8, 9) of piston pumps (6) is used to drive the fluid through the tangential flow filtration module (3).

36 Claims, 3 Drawing Sheets

(51) Int. Cl.
*B01D 63/08* (2006.01)
*B01D 61/18* (2006.01)
*B01D 61/22* (2006.01)
(52) U.S. Cl.
CPC ...... *B01D 63/088* (2013.01); *B01D 2313/243* (2013.01); *B01D 2313/90* (2013.01); *B01D 2315/10* (2013.01)

(56) References Cited

U.S. PATENT DOCUMENTS

| | | | |
|---|---|---|---|
| 6,010,627 A * | 1/2000 | Hood, III | A61K 35/14 210/321.6 |
| 6,432,630 B1 * | 8/2002 | Blankenstein | B01D 57/02 422/186 |
| 7,270,744 B2 | 9/2007 | Petersen et al. | |
| 2001/0037966 A1 | 11/2001 | Petersen et al. | |
| 2002/0043487 A1 | 4/2002 | Schick | |
| 2003/0116487 A1 | 6/2003 | Petersen | |
| 2005/0092662 A1 | 5/2005 | Gilbert et al. | |
| 2005/0205498 A1 * | 9/2005 | Sowemimo-Coker | A61K 35/15 210/782 |
| 2006/0008913 A1 | 1/2006 | Angelescu et al. | |
| 2007/0000838 A1 | 1/2007 | Shih et al. | |
| 2007/0151924 A1 | 7/2007 | Mir et al. | |
| 2008/0047330 A1 * | 2/2008 | Whitehouse | G01N 30/7266 73/61.48 |
| 2009/0101559 A1 | 4/2009 | Bala Subramaniam et al. | |
| 2011/0253629 A1 | 10/2011 | Jovanovic et al. | |

FOREIGN PATENT DOCUMENTS

| | | |
|---|---|---|
| GB | 2417913 | 3/2006 |
| JP | 2008183470 A | 8/2008 |
| JP | 2009221137 A | 10/2009 |
| NO | 2004022983 A2 | 3/2004 |
| WO | 96/34679 | 11/1996 |
| WO | 2006/026253 | 3/2006 |
| WO | 2007/110203 | 10/2007 |

OTHER PUBLICATIONS

The International Search Report, issued on May 3, 2013, in the corresponding PCT Patent Application No. PCT/EP13/56296.
The Office Action, mailed on Oct. 12, 2016, in the U.S. Appl. No. 14/386,085.
The International Search Report, issued on May 31, 2013, in the related PCT Patent Application No. PCT/EP13/56294.
The extended European Search Report, issued on Aug. 28, 2012, in the related European Patent Application No. 12162011.6.
The extended European Search Report, issued on Sep. 6, 2012, in the related European Patent Application No. 12162012.4.
The International Search Report, issued on Jun. 28, 2013, in the related PCT Patent Application No. PCT/EP13/56298.
Alam, et al., "A continuous membrane microbioreactor system for development of integrated modification and separation processes," Chemical Engineering Journal 167 (2011) 418-426.
The Office Action, mailed on Feb. 15, 2017, in U.S. Appl. No. 14/386,085.
The Office Action, mailed on Dec. 14, 2016, in U.S. Appl. No. 14/386,097.

* cited by examiner

MICRO FLOW FILTRATION SYSTEM AND FLOW FILTRATION METHOD FOR A FLUID SAMPLE

This application is a National Stage Application of PCT/EP2013/056296 filed Mar. 25, 2013, which claims priority from European Patent Application 12162009.0, filed on Mar. 29, 2012. The priority of both said PCT and European Patent Application are claimed. Each of prior mentioned applications is hereby incorporated by reference herein in its entirety.

The invention relates to a micro flow filtration system and a flow filtration method for increasing the concentration of a component contained in a fluid sample. The system comprises a fluid channel with a tangential flow filtration module (TFF-module) having a semipermeable membrane capable of separating the fluid sample into a retentate stream and a permeate stream upon passage of the fluid sample. The fluid can flow bidirectionally through the channel passing the TFF-module and thereby increasing the concentration of the fluid.

Flow filtration systems for filtrating a fluid sample using a semipermeable membrane for purposes of purification or concentration are well known in the state of the art. These systems are used to remove particulate or molecular contaminants in the case of a purification or are used to increase the concentration of a component in a fluid for example for laboratory analysis. The membrane of such filtration systems can be located normal to the flow of a fluid sample which is characterized as a normal flow filtration, or the membrane surface can be located essentially parallel to the flow of the fluid sample which is known as tangential flow filtration system (TFF-system).

Tangential flow filtration systems have the advantage that due to the direction of the flow of the sample, which is essentially parallel to the membrane surface, an automatical sweeping and cleansing takes place so that higher fluxes and higher throughputs can often be attained with such systems in relation to corresponding normal flow filtration systems. Further, a large fraction of sample flows continuously over the membrane surface so that a clogging, fouling, or a locally increased concentration is discouraged in such systems. With respect to these and other advantages tangential flow filtration systems (TFF-systems) are often used in industrial drug manufacturing processes and other industrial processes like biotechnology or food and beverage industry.

During the passage of the fluid through the tangential flow filtration module having a semipermeable membrane the components of the solution that are smaller than the pore size of the membrane flow through the membrane as a permeate stream while larger components are retained in the retentate stream. The retentate stream is recirculated or redirected in the flow circuitry and is pumped over the membrane again in a continuous fashion. Such TFF-systems are used to significantly reduce the volume of the sample solution as the permeate stream is withdrawn from the system. So, the sample solution becomes concentrated when the system is driven in concentration mode.

Tangential flow filtration systems are often used in the production of biotechnological and therapeutic agents. The filtration process is usually used to increase the concentration of active ingredients, for example proteins, particles, aggregates, ions, bacteria, viruses, nucleic acids, saccharides or the like. In the development of new proteins, the fluid samples which contain the proteins to be concentrated are often available only in small amounts of a few milliliters (ml). In addition, these protein solutions are often cost intensive or difficult to produce. Therefore, it is desired that also small amounts of approximately 20 ml or less should be used as a start volume for the concentration process.

The handling of such small amounts of a fluid sample is quite difficult. There are only a few flow filtration systems which are able to operate with such small fluid volumes. Normally, a flow filtration system is used which comprises a circuitry with the tangential flow filtration module, a reservoir containing the fluid sample, one or more pressure sensors, valves and a pump to drive the fluid sample through the circuitry. The fluid is driven in a loop through the circuitry so that an unidirectional flow in the circuitry is created. Such filtration systems with a loop circuitry and an internal reservoir have the disadvantage that the internal reservoir makes an additional major contribution to the minimal working volume of the circuitry.

To achieve a predetermined concentration rate of a small fluid volume leads to the requirement that the minimal working volume has to be very small. The desired concentration rate can be estimated as the ratio of the start volume and the minimal working volume of the circuitry. So, if for example the start volume is 20 ml and the requested concentration rate is 20, then the minimal working volume of the circuitry has to be 1 ml at most. The minimal working volume is the amount of fluid which can be driven through the circuitry without pumping air so that a continuous flow through the circuitry can be arranged. A further disadvantage of the unidirectional flow through the tangential flow filtration module is the fact that the distribution of molecules over the length of the membrane which cannot pass the membrane is inhomogeneous. The number of molecules at the downstream side of the retentate channel is often increased compared to the upstream side. So, near the retentate outlet of the TFF-module fouling or clogging can take place over the operation time of the concentration process.

Therefore, if small amounts of a fluid sample have to be concentrated a bidirectional filtration system can be used. Such a system comprises a tangential flow filtration module which is integrated in a linear fluid channel having two ends. At both ends a piston pump or a syringe pump is located so that the fluid can be pumped bidirectionally through the TFF-module using the two pumps. The piston pumps have a reservoir for containing the fluid sample to be concentrated. The reservoir corresponds to the piston swept volume of the pump. So, the piston pumps are designed for a discrete volume range so that the pumps work optimally in a small volume range which is in the same range as the piston swept volume of the piston pump. The smaller the volume is to be handled, the smaller is the piston stroke length which is used to drive the fluid through the filtration system. This leads to the disadvantage that for a small fluid volume to be processed at the end of an filtration process the piston stroke length is also very small which leads to relative large deviations and a relative high inaccuracy.

So, especially in the pharamaceutic and biotechnology industry a strong demand still exists for a tangential flow filtration system being able to operate with small amounts of a fluid sample, preferably with less than 20 ml start volume and being able to concentrate a component of a solution by a large concentration factor. Such filtration systems are not commercially available at the time. It is an object of the invention to provide an optimized TFF-system being able both to handle small amounts of a fluid and to provide the requested concentration factor. Further, a clogging and fouling in the TFF-module should be avoided over a large time period during the filtration process.

The problem is solved by a micro flow filtration system for performing a fluidic process with the features according to claim 1. The object is also solved by a flow filtration method according to claim 11.

The micro tangential flow filtration system according to the invention performing a fluidic process, like increasing the concentration of components contained in a fluid sample or exchanging the solvent of the sample solution by an exchange buffer, comprises a fluid channel with an integrated tangential flow filtration module. The fluid channel is formed by two conduits which are connected to the tangential flow filtration module so that a bidirectional flow of the fluid sample through the channel and the TFF-module is allowed. The internal volume of these conduits can be minimized to reduce the overall working volume of the fluidic circuitry. This can be achieved inter alia by a structural integration of this conduit functionality into an existing fluidic component of the circuitry, e.g. into the housing of the TFF-module or into a T-shaped fluidic element connecting the TFF-module with the piston pumps.

The tangential flow filtration module (TFF-module) has a first fluid port, a second fluid port, a permeate outlet and a semipermeable membrane capable of separating the fluid sample into a retentate stream and a permeate stream upon passage of the fluid sample into the tangential flow filtration module. The TFF-module is a micro flow filtration module having a pore size of the membrane of approximately 10 μm to 0.02 μm or comprising a membrane having a molecular weight cut off of approximately 1 to 1000 kD (kilo Dalton). The membrane could also be capable for performing an ultra filtration so that the pore size of the membrane can be arranged of less than 0.02 μm or the membrane pores are so dimensioned that they result in a molecular weight cut off of the membrane which is even less than 1 kD.

The TFF-module is located in the fluid channel so that one conduit is connected to the first fluid port and the other conduit is connected to the second fluid port to allow a fluid flowing through the channel to pass through the TFF-module.

The micro flow filtration system further comprises at least two pairs of piston pumps wherein each pair of piston pumps comprises two piston pumps and a control unit for controlling the piston pumps. Each piston pump has a piston swept volume forming a reservoir in which a fluid can be contained. At least two piston pumps are arranged at each end of the fluid channel. The piston pumps at the end are arranged in such a manner that they are fluidically connected, preferably in parallel. So, at each end of the fluid channel one piston pump of the first pair of piston pumps is in parallel fluid connection to one piston pump of the second pair of piston pumps. Alternatively, the piston pumps can be fluidically connected in series. The piston pumps of one pair of piston pumps are preferably equal in volume. So, there are similar piston pumps forming one pair of piston pumps.

In the context of the invention a piston pump is understood as a pump having a piston which can be moved in a piston swept volume in such a manner that a fluid contained in the reservoir of the pump (piston swept volume) can be displaced at least partially, preferably completely. A preferred type of a piston pump is a syringe pump which allows to deplete the fluid completely out of the included reservoir. In the context of the invention the phrase piston pump and syringe pump are used synonymously. Nevertheless, also a peristaltic pump can be used in the microfluidic filtration system to drive the fluid through the fluidic channel.

The movement of the pistons of the piston pumps is controlled by the control unit. The control unit is arranged and adapted to control driving of the piston pumps of each pair of piston pumps synchroneously. The control unit can further control the switching from one pair of piston pumps to the other pair of piston pumps. It also can control the switching time for switching.

The control unit controls the movement of the pistons of one pair of piston pumps so that they can perform a synchroneous movement for moving the fluid through the TFF-module with a constant flow speed and a constant pressure rate. Therefore, the stroke of the pistons in the piston swept volume of each piston pump is synchronized or adapted. Because during the concentration process an amount of fluid is withdrawn as a permeate stream in the TFF-module the stroke of the piston of the piston pumps has to be adapted accordingly. Also, if the fluid amount in one pair of piston pumps decreases to a predetermined rate a switching from one pair of piston pumps to the other pair of piston pumps has to be performed. For controlling the switching and/or the switching time the control unit can evaluate information from measurement and control elements which can be a sensor, for example a pressure sensor, a balance, a flowmeter or the like. A person skilled in the art knows a couple of sensing elements which can provide information for the control unit.

In a preferred embodiment the control unit comprises a first control mechanism and a second control mechanism, wherein each control mechanism controls the pistons of one pair of piston pumps. Nevertheless, the control unit or each control mechanism can also control the piston pumps of a plurality of pairs of piston pumps. The control unit can also include more than two control mechanisms.

To control the movement of a piston of a piston pump the control unit can act directly to the piston so that a direct effect from the control unit is arranged. Alternatively the control unit can control a motor or a gear or the like to control the movement of the piston indirectly. Also a motor control unit can be controlled by the control unit for controlling the piston pumps.

In the case of piston pairs arranged in a parallel manner, the system is arranged and configured in such a manner that during a time period of the concentration process only one pair of the at least two pairs of piston pumps is used to drive the fluid through the fluid channel. The other pair of piston pumps is then out of use and the piston of each piston pump of this other pair of piston pumps is in a position that minimized the dead volume of each piston pump of this other pair of piston pumps. So, in a first time period of the concentration process the piston pumps of one pair (first pair) of piston pumps is used. In a second time period of the concentration process the other pair (second pair) of piston pumps can be used to drive the fluid. Thus the ratio of dead volume and remaining fluid volume in the system is optimized. It is evident that also more than two pairs of pumps can be used.

For using piston pump pairs in a serial arrangement the piston of larger diameter is used for the first time period of the concentration process. For the second time period of the concentration process the movement of the plunger with the larger diameter is stopped and only the piston and plunger of the smaller diameter is used.

The filtration process of molecules solved in a liquid solution using a filter membrane leads to a reduction of the fluid volume. The more the fluid volume is reduced, the more the concentration of the molecules increases. Therefore the stroke length of the piston can be adapted to the fluid volume remaining in the filtration system. The piston stroke length of the piston pump can not be controlled very precisely for small volumes relative to the piston swept volume due to the fact that only a very small length of the piston stroke have to be performed and a relative small movement of the piston results in a relative large flow of fluid with respect to the actual fluid volume. Therefore, controlling a piston pump for small volumes or large volumes is quite complex and requires large efforts and expenses. The control unit has to be designed accordingly which also can also be cost intensive.

If the volume in the fluidic system is reduced to an amount which is equal or less than the volume of the smaller piston pump plus the systems dead volume, a switch from the first pair of piston pumps to the second pair of piston pumps, having the smaller volume, takes place. The control unit can process the necessary sensor information and can initiate the switch. This allows an optimized control and handling of the fluid system and an optimized filtration process.

In a preferred embodiment the control unit controls the movement of the piston pumps of the first pair of piston pumps and of the second pair of piston pumps in such a manner that the fluid is driven with a constant pressure through the TFF-module. Therefore, the pressure in the fluid channel can be measured with sensors at adequate locations. The movement of the pistons of the piston pumps can then be adapted accordingly to ensure the continuos flow and constant pressure. The filtration process using the TFF-module is enhanced and a clogging, a fouling or a locally increase of the concentration in the TFF-module is discouraged. This is preferably performed during back and forth pumping and flowing of the fluid through the TFF-module from one piston pump to the other piston pump of the same pair of piston pumps.

In an alternative embodiment the switch from the first pair of piston pumps to the second pair of piston pumps can be performed after a predetermined time after starting of the fluidic process has been reached. The predetermined time interval criterion is preferably used if a filtration process is performed which is highly reproducible and well defined. This criterion can be used if a switching time can be determined from other preliminary tests or can be calculated using theoretical equations based on known system parameters. In this case an online determination of the actual volume can be avoided. The control unit can therefore comprise a timer or the like.

The volume level, at which the switch between the two pairs of piston pumps is conducted, can be monitored using one of a couple of ways. For example, the amount of fluid withdrawn as permeate stream can be measured using a balance so that the amount is weighted and the volume is calculated. Therewith the actual volume in the fluid channel can be determined. Further, the volume can be determined using the distinct stroke length of one piston and monitoring the increments of the motor necessary to perform this distinct stroke length until a change in the systems pressure, e.g. the transmembrane pressure of the filtration module is detected. In each case the sensor information is provided to the control unit for controlling the piston pumps respectively.

In the micro flow filtration system according to the invention, preferably two pairs of piston pumps are used, each pair containing piston pumps for a discrete volume range. The volume of the piston pumps of one pair of piston pumps is larger than the volume of the piston pumps of the other pair of piston pumps. In practical use the first pair of piston pumps comprises piston pumps with a volume which is larger than the volume of the piston pumps of the second pair of piston pumps. This allows to handle a relatively large volume using the first pair of piston pumps having the larger volume. If the volume is reduced to a smaller amount (e.g. if a predetermined fluid volume within the fluidic system is reached) the system switches from the first pair to the second pair of piston pumps to handle the smaller (rest-)volume of the fluid. So, the systems always works with a volume optimized pair of piston pumps with respect to the current fluid volume. This allows an optimized dosing of the fluid and an optimized moving of the piston pumps at each stage of the fluid process.

Preferably the piston pumps of the first pair have a volume which is at least three times larger than the volume of the piston pumps of the second pair, preferably at least five times or ten times larger and particularly preferably at least 25 times larger. In some preferred embodiments the volume of the piston pumps of the first pair are at least 100 times larger than the volume of the piston pumps of the second pair. So, a wide range of volume can be covered with such combination of piston pumps. Preferably the piston pumps of one pair are substantially larger than the piston pumps of the other pair. To achieve an advantageous and positive effect with the combination of the piston pump pairs, the volume of the piston pump pairs has to be different in any case.

So, using a micro flow filtration system according to the invention allows to operate with fluid samples having a volume of at most 100 ml, preferably at most 25 ml and particularly preferably at most 10 ml or 1 ml. Due to the fact that the concentration rate which is desired and the start volume of the fluid sample are influenced by the minimal working volume of the system, a minimal working volume which is as small as possible is desired. Preferably the minimal working volume of the system is at most 1 ml, preferably at most 700 µl, further preferably at most 500 µl, particularly preferably at most 200 µl and also particularly preferably at most 100 µl.

The minimal working volume is the volume of fluid which can be operated in a flow filtration system without pumping air through the system. So, the components, elements, and conduits like the fluidic channel and the TFF-module have to be filled by an amount of fluid which avoids an air cavitation in the liquid solution, in other words, which avoids the entrance of air into the system.

Preferably the volume of the fluid contained in the microfluidic filtration system is equal to the volume of one piston pump of the larger pairs of pumps. The fluid volume contained in the system can also be as large as the sum of the volumes of all piston pumps contained in the system. It is also possible that an external fluid reservoir is connected to the system, e.g. to one of the conduits of the fluidic channel, so that the fluid being withdrawn in the TFF-module is refilled from the external reservoir. A unidirectional fluid flow from the reservoir to the fluidic channel has to be established. This is performed by means known in the state of the art.

Preferably the control unit for controlling the filtration process and especially for controlling the movement of the pistons is adapted to synchronize the stroke of the pistons of each pair of piston pumps. This is especially valuable if a pair of piston pumps consists of equal piston pumps so that the piston pumps have an equal swept volume and a equal diameter. So, the same stroke of the piston (the way that the piston is moved) of each piston leads to the same volume. In other words, the control unit controls the strokes of the pistons such that the piston swept volume of each piston pumps is synchronized accordingly. A control has to be performed in such a manner that pumping of air in the fluid circuit and in the system is avoided.

In a preferred embodiment of the filtration system according to the invention, the system comprises a balance to weight the permeate withdrawn from the fluid channel. Using the weight of the withdrawn fluid mass, the volume of the withdrawn permeate can be calculated. Knowing the start volume of the concentration process allows calculating the actual overall volume which is contained in the system.

Preferably the system comprises at least two pressure sensors for monitoring and measuring the pressure in the channel. Using two pressure sensors allows the determination of the viscosity of the actual liquid solution contained in the fluid channel.

The pressure sensors can also be used to control the concentration process. The two piston pumps of one pair of piston pumps which are in use can be controlled by the control unit depending on the pressure in the fluid channel and/or depending on the transmembrane pressure in the tangential flow filtration module. The transmembrane pressure is the mean value of the two pressure values measured by the two pressure sensors located on opposite sites of the TFF-module. The information of the sensors is provided to the control unit which evaluates the sensor information and generates a control signal for controlling the piston pumps.

So, for example, a desired transmembrane pressure can be adjusted in the system. The piston of the first piston pump moves into the piston swept volume so that fluid is pressed out of the pump into the fluid channel. The pressure in the system measured by the two pressure sensors increases. The piston of the second piston pump of the first pair of piston pumps which is positioned at the opposite end of the fluidic channel moves out of the piston swept chamber so that fluid can reach the piston swept chamber. Consequently the transmembrane pressure can be adjusted again to the desired value. The movement of the second piston at the opposite end of the fluid channel stops or is slowed down when the measured pressure differs from the predetermined transmembrane pressure. If the mean value of the two pressure sensors is smaller than the desired transmembrane pressure the piston of the second piston pump is slowed down or stops. Now, the piston swept chamber of the second piston is at least partly filled with the liquid sample containing the components to be concentrated. In the next step, the cycle starts again, but now the piston of the second pump of the first piston pair moves into the piston swept chamber and the first piston of the first piston pump moves out of its chamber so that the desired transmembrane pressure can be adjusted and controlled.

If the actual amount of fluid falls below a predetermined level, the pistons of the second pair of piston pumps are moved instead of those of the first piston pumps. A transmission from the first pair of piston pumps to the second pair of piston pumps can be arranged. Such transmission (switching) is preferably controlled by a control unit. Then, the process steps continue using the second pair of piston pumps.

In a preferred embodiment of the system according of the invention the piston pumps are motor driven. Preferably the system comprises one motor for each piston pump for driving the piston of the pump. The operation of each piston pump using a separate motor allows a very exact adjustment and an easy control of the piston pumps so that the process parameters can be adapted easily and with only a few regulating steps. Controlling the motors is performed by one single unit or by one control unit for each motor. The same control unit that controls one or several motors or an additional control device can be used to control, monitor and address the motor control units.

Preferably the used motors are stepping motors. So, the motor can be easily and exactly controlled using incremental steps to drive the motor. The fluid to be pumped through the channels and the desired pressure in the channel can be adjusted in the simple way.

In a further preferred embodiment the system comprises an optical-measuring device for determining the concentration and aggregate formation of the components contained in the fluid sample. The optical-measuring device preferably comprises a cuvette which is integrated in the fluidic channel. Using the cuvette an optical measurement of the concentration can be performed. So, a real time measurement is possible. The acquired measuring data correlating to the concentration can be used to online control the concentration process. Preferably the cuvette has a defined cross-section area surrounded by two pressure sensors measuring a pressure difference to calculate the fluids viscosity according to the Hagen-Poiseuille equation. The measuring data (sensor information) can also be used by the control unit to control the pistons of the piston pumps and so to control the whole filtration process.

It is evident that the system according to the invention and also the inventive method can be used for performing a fluidic process such as concentrating of components contained in a fluid sample or for exchanging the solvent of the sample fluid. So, not only a concentration or purification can be performed but also a diafiltration. In the case of diafiltration the piston pump of the pair of piston pumps, respectively, with the smaller volume is filled with the fluid sample. The piston pump of the pair having the larger volume is filled with the exchange buffer or solvent which should be exchanged.

At the beginning of the diafiltration process the pumps with the smaller volume drive the fluid sample through the fluid channel and the TFF-module so that permeate is withdrawn from the system. The piston pumps with the larger volume containing the buffer solution are also working to refill the amount of fluid which is withdrawn of the system via the TFF-module. This can take place continuously which may have the disadvantage in special embodiments that the refill of fluid or exchange buffer using the pumps with the large volume may be imprecise. In such cases it may be advantageous if the pumps containing the exchange buffer (having the larger volume) only starts working if a predetermined amount of fluid has been withdrawn from the system. So, it is also possible to perform a diafiltration with fluid samples of a very small amount of less than 10 ml.

The invention is illustrated in more detail hereafter based on particular embodiments shown in the figures. The technical features shown therein can be used individually or in combination to create preferred embodiments of the invention. The described embodiments do not represent any limitation of the invention defined in its generality by the claims.

Figure 1:
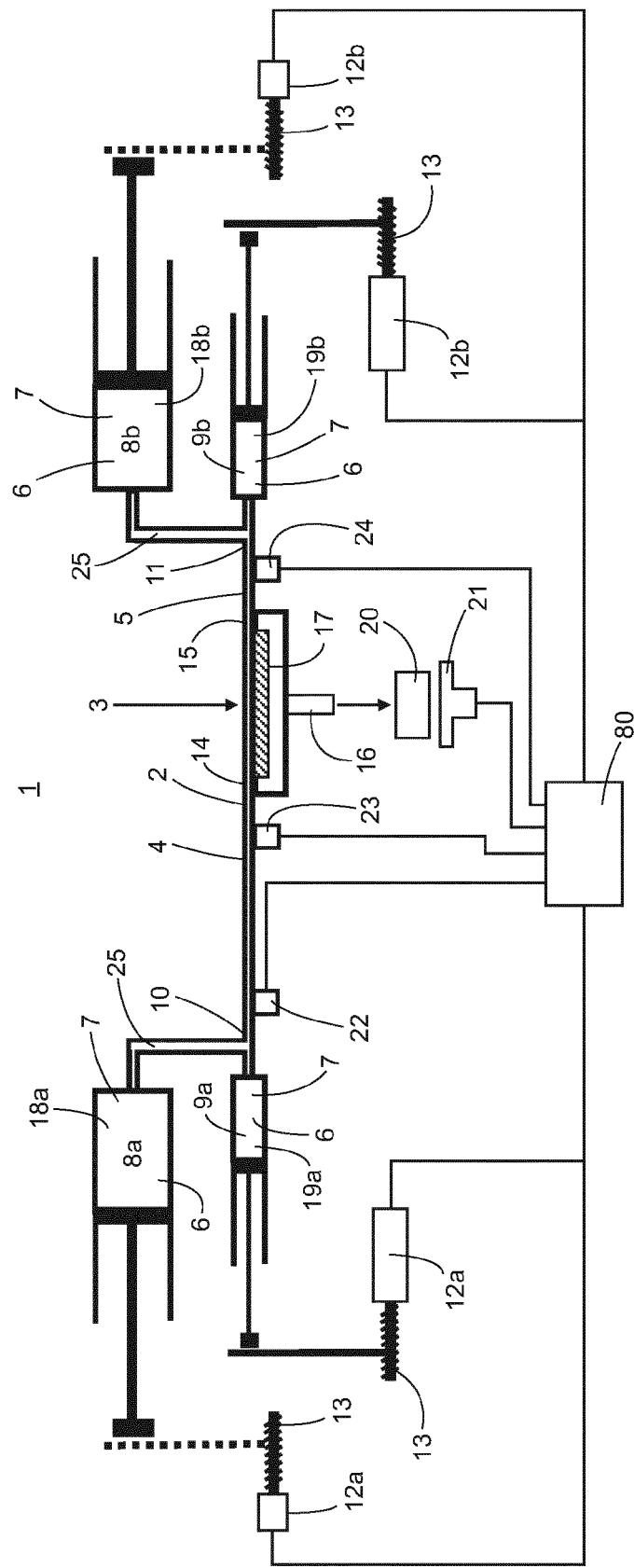
FIG. 1 shows an embodiment of a flow filtration system according to the invention.

FIG. 1 shows a filtration system 1 which comprises a fluid channel 2 having a tangential flow filtration module 3. The fluid channel 2 comprises two conduits 4, 5 which are connected to both ends of the tangential flow filtration module 3. At each end 10, 11 of the fluid channel 2, which is represented by an end of the conduit 4 and 5 respectively, two piston pumps 6 are connected.

The system 1 in FIG. 1 shows altogether four piston pumps 6 which are designed as syringe pumps 7. A first pair 8 of piston pumps 6 which can be designed as syringe pumps 7 respectively consist of a first syringe pump 8a and a second syringe pump 8b. A second pair 9 of piston pumps 6 which can be designed as syringe pumps 7 comprises a first syringe pump 9a and a second syringe pump 9b.

The first pumps 8a, 9a of the first pair 8 and the second pair 9 of syringe pumps are connected at a first end 10 of the fluid channel 2. The first end 10 is displayed on the left side of the fluid channel 2, the second end 11 on the right side of the fluid channel 2. On a second end 11 of the fluid channel 2 the second syringe pump 8b of the first pair 8 and the second syringe pump 9b of the second pair 9 of syringe pumps are connected.

The first syringe pumps 8a, 9a are fluidically connected in parallel at the first end 10. The second syringe pumps 8b, 9b are fluidically connected in parallel at the second end 11. Each of the syringe pumps 7 has a respective piston swept volume or piston swept reservoir containing the fluid. The piston swept reservoir 18a, 18b is the piston swept volume of the syringe pumps 8a, 8b. The syringe pump 9a, 9b has a respective piston swept reservoir 19a, 19b which is the piston swept volume of the respective syringe pump 9a, 9b.

The volume of the syringe pumps 8a, 8b of the first pair 8 of syringe pumps is substantially larger that the volume of the syringe pumps 9a, 9b of the second pair of syringe pumps. Preferably the volume of one of the syringe pumps 8a, 8b of the first pair 8 is in the range of 100 ml to 10 ml. Preferably the volume is approximately 25-10 ml. So, a fluid of approximately 15 ml can be contained in the first syringe pump 8a for example.

The volume of the second pair 9 of syringe pumps 9a, 9b is significantly smaller that the volume of the first pair 8 of syringe pumps 8a, 8b. The volume of one of the syringe pumps 9a, 9b is preferably in the range of 1 ml to 2.5 ml, particularly preferably is a volume of 1 ml. In an optional embodiment the volume of one of the syringe pumps 9a, 9b can also be smaller than 1 ml, preferably in a range of approximately 100 μl to 1000 μl.

Each of the syringe pumps 7 is motor driven. Therefore four motors 12 are comprised in the system 1. Each motor 12 is connected preferably via a gear 13 with the piston of the syringe pumps 7. A control unit 80 controls the motors 12 so that the movement of the pistons of the piston pumps 6 is controlled. The piston pumps 6 are controlled in such a manner that the fluid in the fluid channel 2 is driven back and forth through the TFF-module 3. The motors 12 can be controlled by chopping the motor control current. In this case the control unit 80 can comprise a chopping circuit. Alternatively the control unit 80 could also control the gears 13 connected to the motors 12.

The fluidic system 1 according to the invention has the advantage that a more homogeneous load of the tangential flow filtration module 3 from both sides of the filter is generated. The flux of permeate is more homogeneously distributed over the complete filter area or membrane area of the tangential flow filtration module 3. Compared to a loop like fluidic circuitry the decrease of the permeate flux over the time can be reduced. A further advantage of the fluidic system 1 comprising a fluidic channel 2, for bidirectional pumping, results in shorter fluidic conducts between the pumps 6 and the filter module (TFF-module 3). So, the minimal working volume is reduced with respect to loop like filtration circuitries.

The tangential flow filtration module (TFF-module 3) has a first fluid port 14 and a second fluid port 15 through which the fluid being pumped in the fluid channel 2 passes through the TFF-module. A permeate outlet 16 is fluidically located behind a membrane 17 so that liquid passing the membrane 17 can be withdrawn from the TFF-module 3 as a permeate stream via the permeate outlet 16. The permeate can be collected in a permeate chamber 20.

The system 1 can preferably also comprise a balance 21 which is in contact to the permeate chamber 20 so that the permeate being withdrawn from the TFF-module 3 can be weighted. Based on the measured weight of the permeate, the volume of the permeate can be calculated. So, with a known start volume at the beginning of the concentration process the actual volume in the fluid channel 2 can also be calculated. Therefore, it is possible to monitor the actual volume of the fluid in the system and the concentration of the molecules to be concentrated in the system 1.

The fluid system 1 further comprises at least two pressure sensors 23, 24 to measure the transmembrane pressure. Preferably a third pressure sensor 22 is installed in the fluid channel 2. The measurement of the pressure difference between the two pressure sensors 22, 23 allows the determination of the viscosity of the liquid solution contained in the fluid channel 2 according to the Hagen-Poiseuille equation.

Preferably, the pressure sensors 23 and 24 are located close to the fluid ports 14 and 15 of the filtration module. The measuring results are used to control the respective motors 12 of the syringe pumps 7. The motors 12a, 12b can be controlled using the information of one or more of the pressure sensors 22, 23, 24. The information of the pressure sensors 22, 23, 24 as well as the information from the balance 21 can be used as input data and control information for the control unit 80. This information is processed in the control unit 80 to drive the respective motors 12. Further, the control unit 80 can also comprise an evaluation and monitoring circuit to evaluate the process parameters of the flow filtration process.

In the following a typical filtration process is described in detail to illustrate the use of the system:

A main aspect is the control of the pairs 8, 9 of syringe pumps. The fluid sample containing the components to be concentrated is filled in the syringe reservoir 18a of the first syringe pump 8a of the first pair 8. The control of the pumps 8a, 8b of the first pair 8 of syringe pumps can be performed using a constant transmembrane pressure (TMP) in the TFF-module 3. The pressure is measured using the pressure sensors 23, 24. The piston of the first syringe pump 8a is pushed so that fluid is withdrawn out of the piston swept reservoir 18a and conducted into the fluid channel 2. The pressure measured using the pressure sensors 23, 24 increases then. If the predetermined and desired transmembrane pressure in the TFF-module 3 is reached or the median of the two pressure values p1, p2 at the pressure sensors 23, 24 is larger than the transmembrane pressure the piston of the second syringe pump 8b is moved using the motor 12b. The piston of the pump 8b moves outwards (is pulled), so that the median value of the measured pressures p1, p2 equals the desired transmembrane pressure. If the measured median pressure value is smaller than the desired transmembrane pressure the motor 12b slows down or stops so that the movement of the piston of the second syringe pump 8b also slows down or stops.

If the movement of the piston of the second syringe pump 8b is reduced to control the transmenbrane pressure, the movement of the piston continues if the desired pressure value is determined.

If the movement of the piston of the second syringe pump 8b is stopped due to the fact that the piston swept reservoir 18a of the first syringe pump 8a is depleted and the fluid volume of the first syringe pump 8a is (completely) transitioned to the second syringe pump 8b via the TFF-module 3 then the cycle of moving the pistons of the first syringe pump 8a and the second syringe pump 8b starts again. Now the piston of the second syringe pump 8b is pushed so that the fluid contained in the piston swept reservoir 18b is depleted into the fluid channel 2 and the piston of the first syringe pump 8a is pulled so that fluid can enter the piston swept reservoir 18a. So, a pressure driven control of the syringe pumps 8a, 8b can be performed.

It is self-evident that the pumping cycle (pumping the fluid back and forth between the two pumps of one pair of piston pumps) can be performed several times.

An alternative control is performed by controlling the motors 12a, 12b of the respective first and second syringe pumps 8a, 8b. In this case, a stepping motor is required so that the motor can be controlled by the increments of its rotation. To drive the piston of the first syringe pump 8a the motor 12a is rotated by a predetermined and known amount of increments. To drive the piston of the second syringe pump 8b the motor 12b is used. This motor, which is preferably similar to the motor 12a, moves by the same amount of increments to pull the piston of the second syringe pump 8b out of the second piston swept reservoir 18b. To compensate the fluid volume which is withdrawn from the fluidic system as permeate, the amounts of increments to move the pistons of the syringe pump 8a, 8b are reduced simultaneously by the same amount of increments for both syringe pumps 8a, 8b.

The third possible control can be performed using the balance 21 and to detect the permeate flux and the permeate volume of the liquid which is withdrawn from the TFF-module 3. Therefore, the ratio of volume depleted from a syringe pump 7 to the piston stroke length and the increments of the motor 12 have to be known. The withdrawn permeate is collected within the permeate collection chamber 20 and measured in real time using the balance 21. In a preferred embodiment, the permeate collection chamber 20 comprises a lid or cover to reduce evaporation of the permeate. The piston of the first syringe pump 8a is pushed into the piston swept reservoir 18a so that the fluid is depleted from the reservoir into the fluid channel 2. Therefore the motor is rotated by a predetermined amount of increments. The piston of the second syringe pump 8b is also moved wherein the motor 12b driving the second syringe pump 8b is moved by a reduced amount of increments as the motor 12a driving the first syringe pump 8a. The reduced amount of increments can be calculated from the number of increments used to drive the first syringe pump 8a minus the number of increments which corresponds to the withdrawn permeate.

Further, a combination of the exclusively pressure controlled piston pump regulation and the motor driven regulation can be performed or alternatively a combination of the pressure driven regulation and the regulation over balance and motor can be performed. Further a regulation without any pressure sensors is possible by defining a fluid flow per time and a regulation of the motor steps per period of time. These regulations can be performed by one or more control units 80.

The maximum piston stroke when pushing the piston into the piston swept reservoir is adjusted by a bedstop of the piston. The maximum piston stroke length pulling the piston out of the piston swept reservoir depends on the amount of fluid sample contained in the system 1. The motor 12 is driven depending on the fluid sample volume. Therefore, the motor can be controlled using the balance or using pressure information or by a combination of both control via balance and pressure or fluid flow per time.

Using the balance 21 to control the motor 12 is based on the weight of the permeate withdrawn from the TFF-module 3. Using the weight, the volume of the withdrawn permeate can be calculated. So, the start volume minus the withdrawn permeate volume is the actual volume of the fluid sample in the system 1. The piston is pulled until the allocated piston reservoir volume of the actual piston position equals the actual fluid sample volume minus the minimal volume of the fluidic system 1 which is the minimal working volume of the fluid channel 2 and the TFF-module 3.

During the operation of the fluidic system 1, the volume of the liquid sample within the fluidic system 1 decreases over the time due to the fact that solution is withdrawn from the TFF-module 3 as permeate via the permeate outlet 16. If the actual volume of the fluid sample in the system is smaller or equal to a predetermined value e.g. of one of the syringe pumps 9a, 9b of the second pair 9, the second pair 9 of syringes pumps 9a, 9b is used instead of the first pair 8 of syringe pumps 8a, 8b. So, the use of the first pair 8 of syringe pumps is switched to the second pair 9 of syringe pumps. The switch preferably takes place if the volume of the fluid sample in the system is smaller or equal to the piston swept volume or piston swept reservoir 19a, 19b of one of the syringe pumps 9a, 9b plus the minimal working volume of the system.

Switching the use of the pairs of piston pumps can also be controlled using the balance 21 of the system 1 and/or using the pressure information and the known increments of the stepping motors. A combination of both is possible.

So, the fluidic system 1 according to the invention has several advantages. On the one hand the minimal working volume can be reduced due to the fact that the length of the conduits 4, 5 between the pumps 6, 7 and the TFF-module 3 can be reduced. On the other hand the volume of the piston pumps 6 makes nearly no contribution to the minimal working volume of the fluidic system. Only in the manner of parallel arranged syringe pairs, the connecting conduits 25 between the first end 10 or second end 11 and the first pair 8 of syringe pumps 8a, 8b respectively has an influence to the minimal working volume. Nevertheless, these connecting conduits 25 can be quite short. Further, the internal diameter or internal cross section area of the conduits 4, 5 and the connecting conduit 25 can be less than 1 mm or less than 1 mm$^2$.

Further, the system 1 according to the invention allows a free programming of the flow velocity of the fluid and the shear forces and the transmembrane pressure in the tangential flow filtration module 3. This can be performed easily by using a control unit 80. In order to keep the transmembrane pressure constant, pulling the pistons of the syringe pumps out of the swept volume or reservoir is performed velocity controlled. The transmembrane pressure is generally calculated by the sum of the pressure values of the pressure sensors 23, 24 divided by the number of sensors, here by the factor of two. In a system detecting also the permeate pressure the permeate pressure value is subtracted from the sum of the pressure values of the pressure sensors 23, 24 divided by the number of pressure sensors (here: 2). If no pressure sensor is present within the permeate outlet 16, the permeate pressure value can be estimated as 0 and the formula is reduced to the sum of the pressure values of the pressure sensors 23, 24 divided by the number of pressure sensors. The pressure value from one pressure sensor can be a mean value representing a plurality of pressure measurements from that one pressure sensor. The calculation of the respective values of the sensor information as well as the further processing of the information and measuring data can also be integrated in the control unit 80 and be performed therein.

Figure 2:
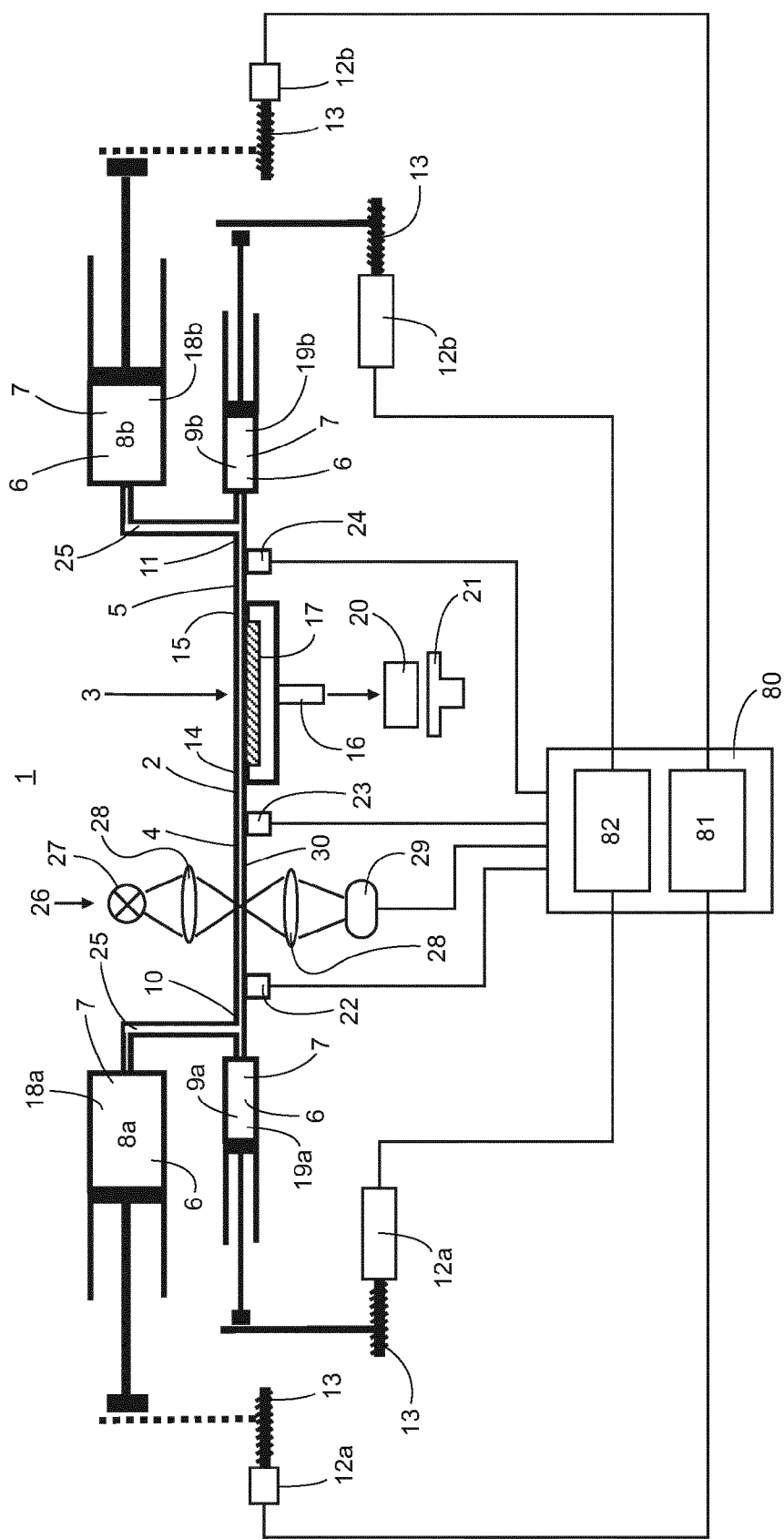
FIG. 2 shows an alternative embodiment of the flow filtration system according to the invention.

FIG. 2 shows an alternative embodiment of the fluidic system according to the invention. The difference to the embodiment shown in FIG. 1 is an additional optical measuring device 26 which allows an online acquisition of the concentration of the components contained in the liquid sample. The components are preferably proteins, particles, aggregates, ions, bacteria, viruses, nucleic acids, saccharides or the like.

The optical measuring device 26 comprises a light source 27 transmitting light in the visible or non visible range like the ultraviolet range, two lenses 28 to conduct the light beam of the light source 27, and a light detector 29 which can be a photo diode or photo multiplier tube, for example. Between the two lenses a cuvette 30 is arranged in the fluid channel 2 so that the light beam passes through the cuvette 30. The concentration of the components of the fluid and when indicated the formation of aggregates can be determined by well-known optical methods based on the Lambert-Beer equation and can be monitored online. So, a further important process parameter can be detected in real time. This allows to perform an optimized concentration process using the fluidic system according to the invention. The system is designed to preferably perform concentration processes with a start volume of the liquid sample of 100 ml or less, preferably with a start volume of at most 10 ml, particularly preferably with a start volume of at most 2 ml.

A further difference of the embodiment with respect to the embodiment shown in FIG. 1 is that a control unit 80 comprises a first control mechanism 81 and a second control mechanism 82. The control mechanisms 81, 82 each controls one pair of piston pumps 8, 9. It is self-evident that the control mechanism 81, 82 could also control gears 13 instead of the motors 12 of the first pair of syringe pumps 8 and of the second pair of syringe pumps 9.

According to the embodiment of FIG. 2 the measurement data of the pressure sensors 22, 23 and 24 are provided to the control unit 80 for further processing and for controlling and creating the respective control signals for the control mechanism 81, 82. The signals provided by the light detector 29 can also be evaluated by the control unit 80. It is further possible to control the light source 27 and/or the light detector 29 of the optical measuring device 26 so that also the visual acquisition of the concentration of the components contained in the liquid sample can be controlled and evaluated.

Figure 3:
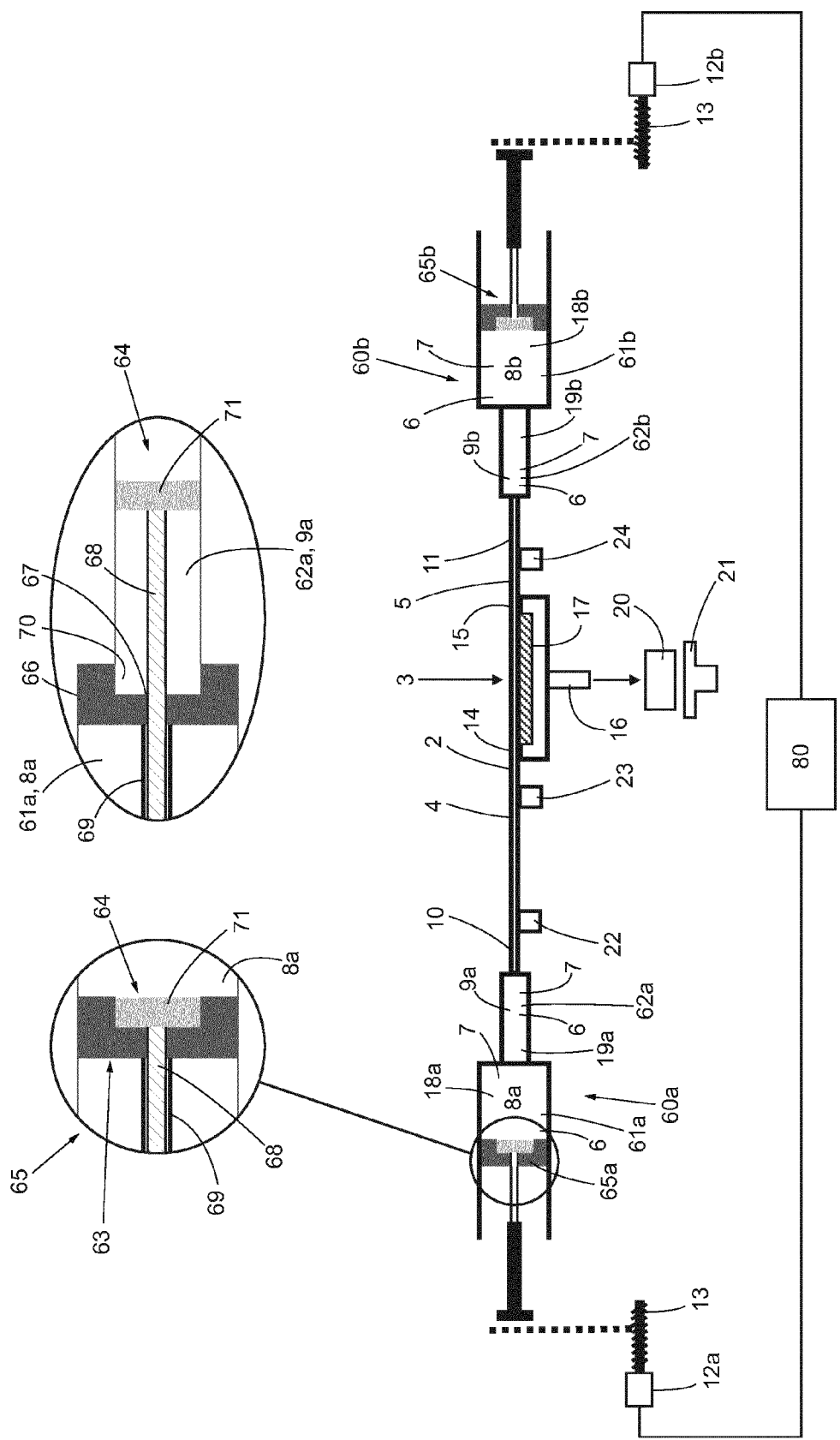
FIG. 3 shows another alternative embodiment of the flow filtration system according to the invention.

FIG. 3 shows an alternative embodiment of the system 1 according to the invention. At each end of the fluidic channel 2 an integrated piston pump 60 is located which comprises two piston pumps 6 combined in one element. The integrated piston pump 60 comprises preferably at least two piston pump chambers 61, 62 which are fluidically serial connected. The two piston pump chambers 61, 62 correspond to the reservoirs of the piston pumps 8a, 9a or 8b, 9b respectively. So, the integrated piston pump 60 combines preferably at least two piston pumps or syringe pumps 7. The two piston pump chambers 61, 62 correspond to the piston swept reservoirs 18, 19 of the piston pumps as shown in FIG. 1 or FIG. 2. The integrated piston pumps 60 are also controlled by a control unit 80.

The integrated piston pump 60 comprises preferably at least two pistons 63, 64 arranged in such a manner that at least one piston being able to move in at least two piston pump chambers 61, 62. The at least two pistons 63, 64 can drive the fluid out of at least one of the piston pump chambers 61, 62. The movement of the pistons 63, 64 is controlled by the control unit 80 via controlling the motors 12.

Preferably the integrated piston pump 60 comprises an integrated piston 65 having at least a primary piston 63 and a secondary piston 64 which are preferably coupled to another. So, the two pistons 63, 64 form an integrated piston 65.

Preferably the primary piston 63 and the secondary piston 64 can be moved synchronously in at least one of the piston pump chambers 61, 62.

At the left end of the fluid channel 2, as shown in FIG. 3, the integrated piston pump 60a has a motor driven integrated piston 65a which comprises the primary piston 63a and the secondary piston 64a. The two pistons 63, 64 are shown in detail in the small picture above.

The two pistons 63a, 64a are coupled together in such a manner that they move synchronously on at least a part of a movement path in the piston pump chamber 61a which corresponds to the piston swept reservoir 18a of the first syringe pump 8a as shown in FIG. 1. The integrated piston pump 65a moves into the piston pump chamber 61a wherein the integrated piston 65a stops at the (right) end of the piston pump chamber 61a. At this point of the movement path the piston pump chamber 61 is (essentially) completely depleted. Now, at the end of the movement path in the piston pump chamber 61 the secondary piston 64a moves further into the piston pump chamber 62 presses thereby the fluid contained in this piston pump chamber 62 into the fluid channel 2.

In a preferred embodiment the primary piston pump 63 comprises a piston disc 66 having a through hole 67 through which a plunger 68 of the secondary piston 64 extends. The plunger 68 of the secondary piston 64 is sealed in the trough hole 67, so that no fluid can escape through the through hole.

The integrated piston 65 as shown in FIG. 3 has a recess 70 in which the piston disc 71 of the secondary piston 64 is mounted, preferably form fitted mounted. The piston disc 71 of the secondary piston 64 can also be located on the surface of a plain piston disc 66 of the primary piston 63 without any recess.

In the preferred embodiment according to FIG. 3 the plunger 69 of the primary piston 63 is preferably a hollow plunger so that the plunger 68 of the secondary piston 64 can extend through the hollow plunger 69.

In this embodiment it is possible that the integrated piston 65 with both pistons 63, 64 moves along a movement path in the first piston chamber 61, which has preferably a larger volume than the second piston pump chamber 62. The secondary piston 64 moves not only through the first piston pump chamber 61 but also through the second piston pump chamber 62 to deplete this chamber completely. If the overall volume in the system decreases to a predetermined amount which corresponds to the volume of the second piston pump chamber 62 (having the smaller volume of the two piston pump chambers) then only the secondary piston 64 is moved to drive the fluid through the fluid channel 2 and the TFF-module 3. This method ensures that also very small amounts of a fluid sample can be handled securely and that the dead volume of the system is quite small because no connecting conduit between the two piston pumps 8, 9 makes a contribution to the minimal working volume of the system 1.

It is evident that the integrated piston 65 can not only be arranged in the manner shown in FIG. 3. The two pistons 63, 64 can also be coupled such that they are located one next to the other and that one of the pistons will move further not only in one chamber but also in another chamber of the integrated piston pump.

The invention claimed is:

1. A micro flow filtration system for performing a fluidic process, such as concentrating of components contained in a fluid sample or for exchanging the solvent of the sample fluid, the system (1) comprising:
  a fluid channel (2) having two ends (10, 11) and being formed by conduits (4, 5) allowing a bidirectional flow of the fluid sample through the channel (2);
  a tangential flow filtration module (3) (TFF-module) having a first fluid port (14), a second fluid port (15), a permeate outlet (16) and a semipermeable membrane (17) capable of separating the fluid sample into a retentate stream flowing through one of the ports (14, 15) and a permeate stream upon passage of the fluid of the sample through the semipermeable membrane (17) and through the permeate outlet (16);
  at least two pairs (8, 9) of piston pumps (6) having each two piston pumps (6), each piston pump having a piston swept volume forming a reservoir (18, 19) being able to contain a fluid, the piston pumps (6) being capable to drive a fluid flow;
  the volume of the piston pumps (6) of one pair (8) of piston pumps (8*a*, 8*b*) is larger than the volume of the piston pumps (6) of the other pair (9) of piston pumps (9*a*, 9*b*),
  a control unit for controlling the piston pumps (6),
  wherein
  the TFF-module (3) is located in the fluid channel (2) so that one conduit (4) is connected to the first fluid port (14) and the other conduit (5) is connected to the second fluid port (15) to allow a fluid flowing through the channel (2) to pass through the TFF-module (3);
  at each of the ends (10, 11) of the channel (2) one piston pump (6) of each pair (8, 9) of piston pumps is arranged in such a manner that the piston pumps 6 are fluidically connected;
  the control unit is arranged and adapted to control driving of the piston pumps of each pair (8, 9) of piston pumps (6) synchronously and/or to control the switching and/or the switching time for switching from one pair (8) of piston pumps (8*a*, 8*b*) to the other pair (9) of piston pumps (9*a*, 9*b*) and
  the system is arranged and adapted such that during the fluidic process at least for a period of time only one of the pairs (8, 9) of piston pumps (6) is used to drive the fluid flow through the fluid channel (2).

2. The micro flow filtration system according to claim 1, characterized in that the piston pumps (6) at the end of the fluid channel (2) are fluidically connected in parallel.

3. The micro flow filtration system according to claim 1, characterized in that the piston pumps (6) at the end of the fluid channel (2) are fluidically connected in series.

4. The micro flow filtration system according to claim 3, characterized in that the integrated piston pump (60) comprises an integrated piston (65) having at least a primary piston (63) and a secondary piston (64), wherein the primary piston (63) and a secondary piston (64) are able to move synchronously in at least one chamber (61, 62).

5. The micro flow filtration system according to claim 1, characterized in that the volume of the piston pumps (6) of the first pair (8) of piston pumps (8*a*, 8*b*) is at least three times larger than the volume of the piston pumps (6) of the second pair (9) of piston pumps (9*a*, 9*b*).

6. The micro flow filtration system according to claim 1, characterized in that the system (1) comprises a balance (21) for weighting the permeate withdrawn from the TFF-module (3).

7. The micro flow filtration system according to claim 1, characterized in that the system (1) comprises in the fluid channel or in the TFF-module (3) at least one pressure sensor (22, 23, 24) for monitoring and measuring the pressure in the system (1).

8. The micro flow filtration system according to claim 1, characterized in that the system (1) comprises an optical measuring device (26) for acquiring the concentration of the components contained in the fluid sample.

9. The micro flow filtration system according to claim 1, characterized in that the control unit (80) is adapted to synchronize the stroke of the pistons of the piston pumps (6) of the same pair (8, 9) of piston pumps (6) such that the piston swept volume of the piston pumps (6) is synchronously adapted.

10. The micro flow filtration system according to claim 1, characterized in that the control unit (80) controls the piston pumps (6) of one pair (8,9) of piston pumps (6) in such a manner that the fluid flows back and forth through the TFF-module (3) from one piston pump (6) to the other piston pump (6) of one pair (8, 9) of piston pumps (6).

11. A flow filtration method for concentrating a component contained in a fluid sample using a tangential flow filtration module (3), the method comprising the following steps:
  providing a micro flow filtration system (1) comprising
    a fluid channel (2) having two ends (10, 11) and being formed by two conduits (4, 5) allowing a bidirectional flow of the fluid sample through the channel (2);
    a tangential flow filtration module (3) having a first fluid port (14), a second fluid port (15), a permeate outlet (16) and a semipermeable membrane (17) capable of separating the fluid sample;
    at least two pairs (8, 9) of piston pumps (6), each piston pump (6) forming a reservoir (18, 19) being able to contain a fluid;
    a control unit (80) for controlling movement of the pistons of the piston pumps (6);
  wherein
    the TFF-module (3) is located in the fluid channel (2) so that one conduit (4) is connected to the first fluid port (14) and the other conduit 5 is connected to the second fluid port (15);
    at each of the ends (10, 11) of the channel (2) one piston pump (6) of each pair (8, 9) of piston pumps (6) is arranged in such a manner that the piston pumps (6) are connected fluidically;
    the piston pumps (6) of a first pair (8) of piston pumps have a larger volume than the piston pumps (6) of a second pair (9) of piston pumps (6);
    the control unit (80) is arranged and adapted to control of moving the pistons of the piston pumps of each pair (8, 9) of piston pumps synchronously and/or to control the switching and/or the switching time for switching from one pair (8) of piston pumps (8a, 8b) to the other pair (9) of piston pumps (9a, 9b), filling at least one piston pump (6) of the first pair (8) of piston pumps with a fluid;

moving the piston of the first piston pump (8a) of the first pair (8) of piston pumps controlled by the control unit (80) in a first direction to reduce the piston swept volume to drive the fluid sample from the first piston pump (8a) through the fluid channel (2) and to pass the TFF-module (3) thereby increasing the concentration of the components in the fluid sample in the system (1) and withdrawing an amount of fluid in a permeate stream;

moving the piston of the second piston pump (8b) of the first pair (8) of piston pumps controlled by the control unit (80) in the first direction to enhance the piston swept volume to allow fluid to enter the piston pump (8b) after passage through the fluid channel (2);

moving the piston of the second piston pump (8b) and the piston of the first piston pump (8a) of the first pair (8) of piston pumps controlled by the control unit (80) in a second direction opposite to the first direction to drive back the fluid sample from the second piston pump (8b) through the TFF-module (3) into the first piston pump (8a);

determining if the volume of the fluid sample in the system (1) has been reduced below a predetermined value or if an predetermined time interval after starting of the process has been reached;

repeating the steps of moving the first and second piston pumps (8a, 8b) of the first pair of piston pumps (8) controlled by the control unit (80) in the first and second direction until the predetermined value or the predetermined time interval has been reached, thereby driving the fluid back and forth through the TFF-module (3); and if the volume of the fluid sample in the system (1) has been reduced below the predetermined value or if the predetermined time interval after starting of the process has been reached, using the piston pumps (9a, 9b) of the second pair (9) of piston pumps according to the steps above thereby establishing a continuous bidirectional flow of fluid in the channel (2).

12. The flow filtration method according to claim 11, characterized in that moving the piston pumps (8, 9) of the first pair (8) of piston pumps and of the second pair (9) of piston pumps is controlled by the control unit (80) in such a manner that the fluid is driven with a constant pressure through the TFF-module (3).

13. The flow filtration method according to claim 11, characterized in that the volume of the piston pumps (6) of one pair (8) of piston pumps (8a, 8b) is at least three times larger than the volume of the piston pumps (6) of another pair (9) of piston pumps (9a, 9b).

14. The flow filtration method according to claim 11, characterized in that the volume of the fluid sample in the system (1) is determined by weighting the permeate withdrawn from the TFF-module (3).

15. The flow filtration method according to claim 11, characterized in that the volume of the fluid sample in the system is determined by measuring or determining the piston stroke length.

16. The flow filtration method according to claim 11, characterized in that the piston pumps (6) are motor driven.

17. The flow filtration method according to claim 11, characterized in controlling the flow from the first piston pump (8a, 9a) to the second piston pump (8b, 9b) of a pair (8, 9) of piston pumps by monitoring the actual pressure of the fluid in the system (1).

18. The flow filtration method according to claim 11, characterized in
controlling the flow from a first piston pump to a second piston pump of a pair (8, 9) of piston pumps by an incrementally driven motor.

19. The micro flow filtration system according to claim 1, characterized in that the piston pumps (6) are motor driven.

20. The micro flow filtration system according to claim 3, wherein at least two of the piston pumps (6) located at one end of the fluid channel (2) are combined in an integrated piston pump (60) having at least two piston pump chambers (61, 62) fluidically serial connected and having at least two pistons (63, 64) arranged in such a manner that at least one piston being able to move in at least two piston pump chambers (61, 62) and being able to drive the fluid out of at least one of the at least two piston pump chambers (61, 62).

21. The micro flow filtration system according to claim 4, wherein said primary piston (63) and secondary piston (64) are coupled to another.

22. The micro flow filtration system according to claim 4, wherein the primary piston (63) and secondary piston (64) are able to move synchronously in at least one chamber (61, 62) and at the end of the movement path in a chamber (61) the secondary piston (64) being able to move further in another chamber (62) of the integrated piston pump (60).

23. The micro flow filtration system according to claim 5, characterized in that the volume of the piston pumps (6) of the first pair (8) of piston pumps (8a, 8b) is at least five times larger than the volume of the piston pumps (6) of the second pair (9) of piston pumps (9a, 9b).

24. The micro flow filtration system according to claim 5, characterized in that the volume of the piston pumps (6) of the first pair (8) of piston pumps (8a, 8b) is at least ten times larger than the volume of the piston pumps (6) of the second pair (9) of piston pumps (9a, 9b).

25. The micro flow filtration system according to claim 5, characterized in that the volume of the piston pumps (6) of the first pair (8) of piston pumps (8a, 8b) is at least 25 times larger than the volume of the piston pumps (6) of the second pair (9) of piston pumps (9a, 9b).

26. The micro flow filtration system according to claim 5, characterized in that the volume of the piston pumps (6) of the first pair (8) of piston pumps (8a, 8b) is at least 100 times larger than the volume of the piston pumps (6) of the second pair (9) of piston pumps (9a, 9b).

27. The micro flow filtration system according to claim 1, characterized in that the system (1) comprises in the fluid channel or in the TFF-module (3) at least two or more pressure sensors (22, 23, 24) located on opposite sides of the TFF-module (3) which can be used to determine the transmembrane pressure across the semipermeable membrane (17).

28. The micro flow filtration system according to claim 8, wherein the optical measuring device (26) comprises a cuvette (30) integrated in the fluid channel (2).

29. The flow filtration method according to claim 13, characterized in that the volume of the piston pumps (6) of one pair (8) of piston pumps (8a, 8b) is at least five times larger than the volume of the piston pumps (6) of another pair (9) of piston pumps (9a, 9b).

30. The flow filtration method according to claim 13, characterized in that the volume of the piston pumps (6) of one pair (8) of piston pumps (8a, 8b) is at least 25 times larger than the volume of the piston pumps (6) of another pair (9) of piston pumps (9a, 9b).

31. The flow filtration method according to claim 13, characterized in that the volume of the piston pumps (6) of one pair (8) of piston pumps (8a, 8b) is at least 100 times larger than the volume of the piston pumps (6) of another pair (9) of piston pumps (9a, 9b).

32. The flow filtration method according to claim 14, characterized in that the volume of the fluid sample in the system (1) is determined by weighting the permeate withdrawn from the TFF-module (3) using a balance (21).

33. The flow filtration method according to claim 16, characterized the system (1) comprises for each piston pump (6) or piston pump pair (8, 9) a motor (12) for driving the piston pump (6).

34. The flow filtration method according to claim 11, characterized in controlling the flow from the first piston pump (8a, 9a) to the second piston pump (8b, 9b) of a pair (8, 9) of piston pumps by monitoring the transmembrane pressure of the fluid in the system (1).

35. The flow filtration method according to claim 18, wherein said incrementally driven motor is a stepping motor (12) to drive the piston pumps (6) and controlling the increments moved by the motor (12).

36. The micro flow filtration system according to claim 19, wherein the system (1) comprises for each piston pump (6) or piston pump pair (8, 9) a motor (12) for driving the piston pump (6).

* * * * *